United States Patent [19]

Upham

[11] 4,270,717
[45] Jun. 2, 1981

[54] ELASTOMERIC INSTRUMENT CLAMP

[75] Inventor: Neil R. Upham, Jackson, Mich.

[73] Assignee: Aeroquip Corporation, Jackson, Mich.

[21] Appl. No.: 67,275

[22] Filed: Aug. 17, 1979

[51] Int. Cl.³ .............................................. G12B 9/00
[52] U.S. Cl. ................................... 248/27.1; 361/346
[58] Field of Search ................ 248/27.1, 27.3, 205 R; 174/58; 312/242; 361/346; 324/156

[56] References Cited

U.S. PATENT DOCUMENTS

| 1,901,197 | 3/1933 | Simpson | 324/156 X |
| 2,130,863 | 9/1938 | Stickney et al. | 324/156 |
| 2,227,117 | 12/1940 | Woodson | 248/27.1 X |
| 2,352,049 | 6/1944 | Weaver | 324/156 X |
| 2,495,531 | 1/1950 | Lederer | 361/346 |
| 3,504,876 | 4/1970 | Swanson | 248/27.1 |
| 3,599,910 | 8/1971 | Wipff |  |
| 4,066,838 | 1/1978 | Fujita | 248/27.1 X |

Primary Examiner—J. Franklin Foss
Attorney, Agent, or Firm—Beaman & Beaman

[57] ABSTRACT

An instrument clamp or holder particularly suitable for mounting aircraft instruments within an instrument panel. The clamp is of an annular, rectangular configuration defining an opening into which the instrument is received. Elongated elastomeric elements located adjacent each clamp corner are associated with an individual threaded compression member adapted to compress and expand the elastomer and force the same against the instrument casing to frictionally support the casing within the clamp, and simultaneously resiliently mount the instrument.

3 Claims, 8 Drawing Figures

ELASTOMERIC INSTRUMENT CLAMP

BACKGROUND OF THE INVENTION

Aircraft instruments are commonly mounted upon the instrument panel within a holder or clamp utilizing a mechanical linkage, cam, or the like for constricting the instrument within the clamp. The clamp is supported on the backside of the instrument panel, and through operating means accessible from the panel front the clamp may be tightened upon the instrument casing after the instrument has been inserted through the panel opening into the clamp. By operation of the clamp actuator the instrument may be readily inserted into the clamp, and removed therefrom, through the front side of the panel.

An instrument clamp has been proposed using a compressible elastomer wherein expansion of the elastomer is utilized to produce a frictional support of the instrument casing, and such a construction is shown in U.S. Pat. No. 3,599,910. This patent utilizes an elastomeric ring and translatable collars for compressing the ring whereby a circumferential engagement with the instrument casing is produced. However, as the elastomer support is not throughout the length of the holder the instrument casing is capable of angular movement with respect to the holder, and a positive and vibration absorping support of the instrument is not achieved.

It is an object of the invention to provide an instrument clamp which may be molded of a dielectric material by high production techniques wherein superior dimensional tolerances may be achieved as compared with conventional metal stamped clamps.

An additional object of the invention is to provide an instrument clamp holder which is of a greater rigidity than conventional clamp constructions and reduces the likelihood of the instrument casing binding in the clamp during removal thereof.

A further object of the invention is to provide a clamp for instrument casings wherein an elastomer is used to hold the casing within the clamp producing a high friction mounting having significant shock and vibration isolation characteristics.

Additionally, an object of the invention is to provide an instrument casing clamp which readily releases the instrument casing when desired, and wherein the actuation screws for the clamp will not loosen during vibration.

Another object of the invention is to provide an instrument clamp for aircraft panels capable of meeting standard clamp specifications, and wherein operation of the clamp is readily achieved from the panel front by screw actuators, such screw actuators also mounting the clamp upon the panel.

In the practice of the invention a clamp of generally rectangular annular configuration is injection molded of a nonmetallic dielectric synthetic material and the housing defines an opening having four corners each having an elongated recess defined therein by the adjacent housing sides. An elongated elastomeric element is mounted within each recess, and each element includes a bore extending the length thereof in which a threaded screw is received. The head of the screw is adapted to be disposed adjacent the instrument panel at the front side thereof, and a compression plate is mounted upon the opposite screw end in engagement with the elastomer material wherein rotation of the screw compresses the elastomer and forces the elastomeric material radially inward for engagement with the instrument casing closely received within the housing opening. Thus, the instrument casing is frictionally supported within the clamp housing at four equally spaced locations substantially throughout the clamp length and upon the elastomeric material. In this manner the instrument casing is isolated from the clamp and instrument panel by the elastomeric material, and also electrically isolated therefrom.

As the screw heads are accessible from the front of the panel front the compression of the elastomeric elements is readily achieved, and the instrument casing may be easily inserted into, or removed from the clamp.

BRIEF DESCRIPTION OF THE DRAWING

The aforementioned object and advantages of the invention will be appreciated from the following description and accompanying drawing wherein.

DESCRIPTION OF THE PREFERRED EMBODIMENT

Figure 1:
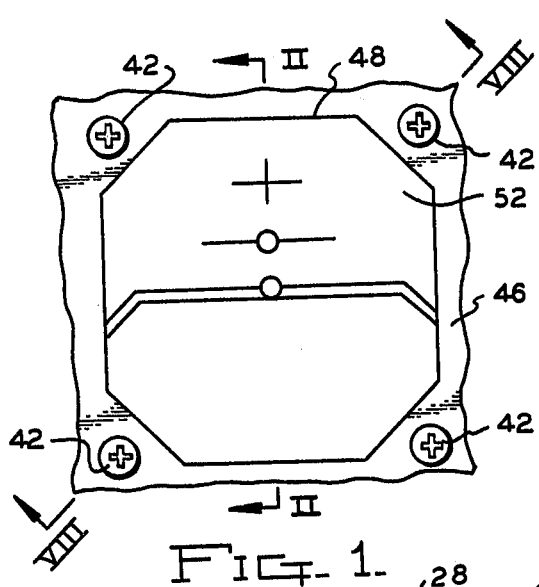
FIG. 1 is a detail, front view of an aircraft instrument as mounted in a panel utilizing the clamp of the invention.

The instrument clamp in accord with the invention comprises a rectangular housing 10 as will be best appreciated from FIGS. 2-6. The housing consists of four interconnected sides 12 each having an inner surface 14 and intersecting the adjacent side at right angles defining four corners. At the housing front end at the front edge 16 the corners are enclosed by gussets 18 which, together with the front edges of the sides 12, define a planar mounting surface for the clamp. At the clamp rear end the corners are provided with gussets 20. Gussets 18 are each formed with a cylindrical hole 22, and the gusset undersurface 24 is obliquely related to the axis of the associated hole 22, FIG. 5. Gussets 22 are formed with holes 26 coaxially aligned with the front gusset holes 22.

Figures 7, 8:
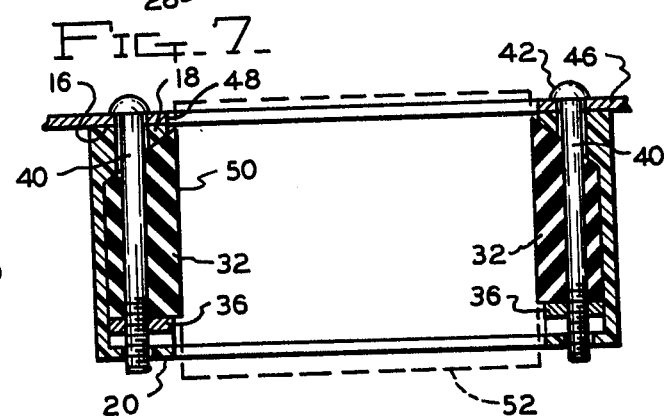
FIG. 7 is an enlarged, detailed, sectional view as taken along Section VII—VII of FIG. 5.
FIG. 8 is a sectional view illustrating the elastomeric elements in an expanded condition as taken along Section VIII—VIII of FIG. 1.

The housing sides 12 are recessed at 28, defining longitudinally extending shoulders 30, FIG. 7, and these recesses extend between aligned gussets 18 and 20. Elastomeric elements 32 of a generally triangular cross section are mounted within each of the corners within the recess thereof, FIG. 6, and the elastomer elements substantially fill the associated recess as will be appreciated from FIGS. 5 and 6. The elements 32 are formed of rubber or similar material such as Buna "N".

Each elastomer element 32 is provided with an elongated hole 34 extending therethrough for its length, the holes 34 being coaxial aligned with the gusset holes 22 and 26.

Figure 5:
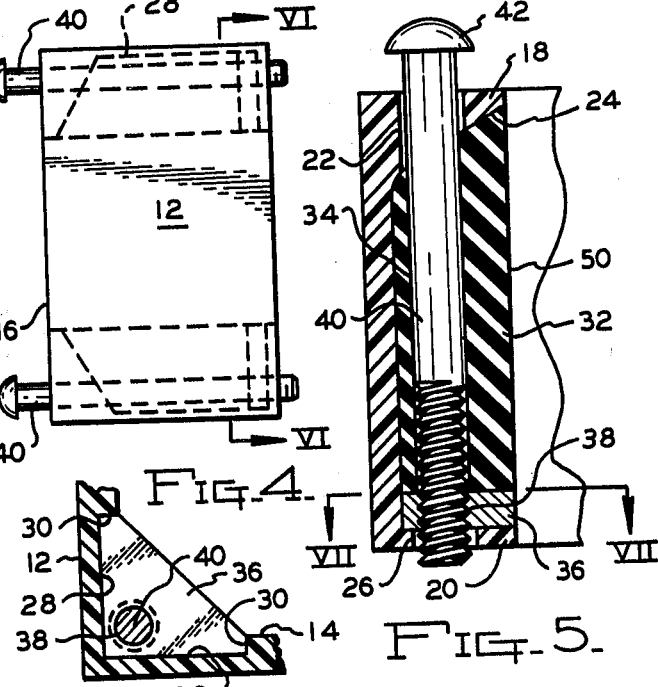
FIG. 5 is an enlarged, detailed, sectional view as taken along Section V—V of FIG. 3.
Figure 6:
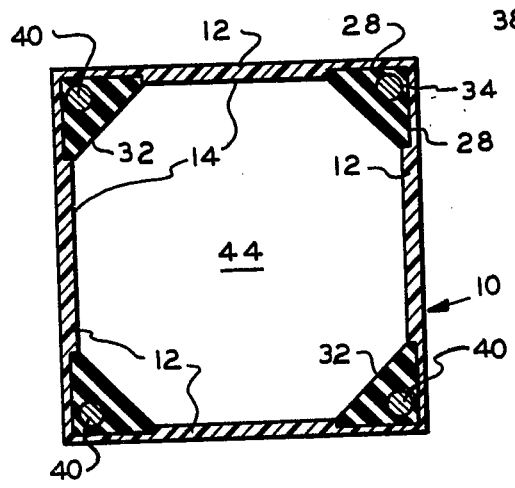
FIG. 6 is a sectional view of the clamp as taken along Section VI—VI of FIG. 4.

A substantially triangular compression plate 36 having a threaded hole 38 is received within each corner recess adjacent the gusset 20, FIG. 5, and a threaded screw 40 extending through gusset holes 22 and 26 and elastomer hole 34, and threadedly associated with plate hole 38 provides the means for displacing the plate 36 along the screw length. The screws are each provided with an enlarged head 42 provided with a screwdriver receiving slot, preferably of the Phillips type.

Figure 3:
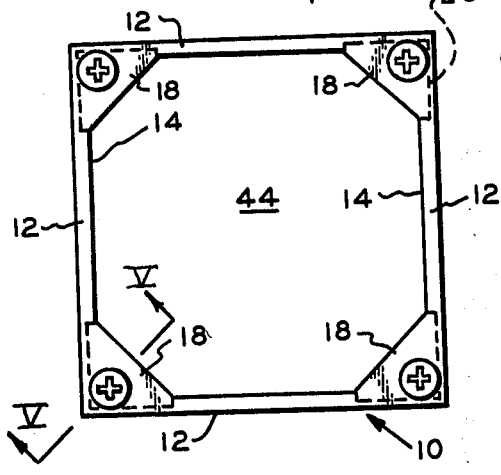
FIG. 3 is a front elevational view of the clamp, per se.
Figure 4:
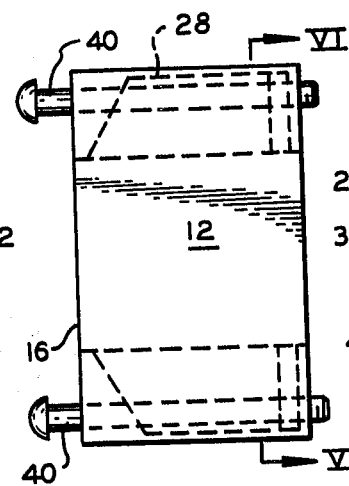
FIG. 4 is a side elevational view of the clamp as taken from the right of FIG. 3.

As will be appreciated from FIG. 3, the edges of gussets 18 and the sides 12 create an octagonal opening 44 within the housing 10, and this opening is in dimensional conformance with aeronautical instrument clamp standards wherein an instrument casing may be closely received within the clamp housing opening.

Figure 2:
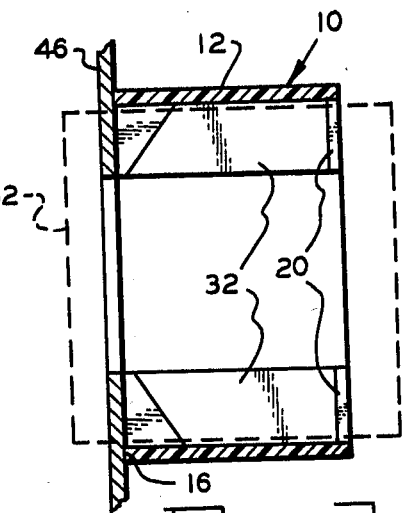
FIG. 2 is an elevational sectional view of the panel and instrument clamp as taken along Section II—II of FIG. 1, the instrument casing being shown in dotted lines.

The clamp is assembled to a panel 46, FIGS. 1 and 2, by the screws 40 which extend through holes defined in the panel 34 adjacent an opening 48 formed in the panel. The screw holes being spaced to align with the clamp housing holes 18. Thus, upon placing the clamp front edge 16 against the backside of the panel 46, FIG. 2, the insertion of the screws 40 through the holes of the panel, into the gusset holes 22, the elastomer hole 34, and threading the screws into the compression plates 36 will produce a positive mechanical connection between the clamp and the housing panel.

When it is desired to mount an instrument within the clamp housing the clamping plates 36 will be located as shown in FIG. 5, i.e., adjacent the housing gussets 20, and the elastomer elements 32 will be in a relaxed, non-compressed condition. The element's surfaces 50 will be in substantial alignment with the gusset surfaces, and the instrument casing 52 may be readily inserted through the panel opening 48 into the clamp opening 44 without interference. Once the instrument casing is located within the clamp housing as desired the screws 40 are tightened. As the screws are tightened the compression plates 36 are drawn toward the gussets 18, compressing the associated elastomer and forcing the elastomer radially inward into a frictional engagement with the instrument casing 52. The inclined orientation of the gusset surfaces 24 aids in the inward deformation of the elastomer elements, and the screws will continue to be sequentially tightened until the desired frictional engagement with the instrument casing is achieved.

FIG. 8 represents a typical relationship between the clamp and an instrument casing upon compression of the elements 32. The inward deformation of the elastomeric elements produces an effective frictional engagement between the clamp and instrument casing, and as the instrument casing is solely supported upon the elastomeric elements the casing is isolated from the clamp housing by the elastomer producing a shock and vibration absorption and isolation.

When it is desired to remove the instrument from the panel 46 the screws 40 are backed off to locate the clamping plates 36 adjacent the gussets 20 permitting the elastomeric elements to return the non-expanded, relaxed condition of FIG. 5, and the instrument casing 52 may then be easily withdrawn from the clamp.

Preferably, the clamp housing 10 is injection molded of a synthetic material such as acetal which is dielectric. Thus, electric insulation of the instrument casing is achieved by the housing, as well as the elastomeric support of the instrument. The natural lubricity of the housing material insures an ease of installation and removal of the instrument, and the injection molded construction permits very close dimensional tolerances to be maintained. The homogeneous clamp housing construction assures high rigidity, and minimizes the likelihood of the instrument binding within the clamp.

As the tightening of the screws 40 compresses the elements 32 a continuous biasing force is imposed upon the compression plates 36 and the screws 40 which serves to lock the screws against accidental loosening due to vibration, creating a self-locking action. As no cam surfaces or relatively sliding parts of the type conventionally used with instrument clamps are present a dependability of operation is achieved constituting a significant improvement over prior art instrument clamps. The fact that the instrument casing 52 is supported along it's axial length for a distance substantially equal to the axial length of the housing clamp assures proper orientation of the instrument within the clamp, eliminating tilting and angular movement or binding attendant with the removal of instrument casings from conventional clamps.

It will be appreciated that various modifications to the inventive concepts may be apparent to those skilled in the art without departing from the spirit and scope of the invention.

I claim:

1. A clamp for mounting instruments within a panel comprising, in combination, an annular housing having an inner surface having an axis and defining an opening for receiving an instrument casing, a plurality of elongated elastomer elements mounted on said housing spaced about the periphery of said opening and adjacent said inner surface and having their lengths disposed substantially parallel to said housing inner surface axis, and individual compression means associated with each elastomer element for selectively compressing and expanding the associated element to deform the element inwardly of said inner surface into engagement with an instrument casing within said housing opening for resiliently supporting the instrument casing within said housing.

2. In a clamp for mounting instruments as in claim 1 wherein said compression means comprises a headed screw extending through a bore defined in the associated element and a plate threadedly mounted on each screw engaging the associated element for compressing and deforming the associated element upon being displaced by rotation of the associated screw.

3. In a clamp for mounting instruments as in claim 1 wherein said housing is of a rectangular configuration having four corners, an elastomer element being located in each housing corner and outwardly confined by the associated housing corner and inwardly unconfined in the direction toward said housing opening.

* * * * *